(12) United States Patent
Brodbeck et al.

(10) Patent No.: US 10,802,699 B2
(45) Date of Patent: Oct. 13, 2020

(54) SERVICE MODE SELECTION SYSTEM FOR SERVICE VEHICLE

(71) Applicant: Federal Signal Corporation, Oak Brook, IL (US)

(72) Inventors: Jared James Brodbeck, Metamora, IL (US); Benjamin Bacha, Streator, IL (US)

(73) Assignee: Federal Signal Corporation, Oak Brook, IL (US)

( * ) Notice: Subject to any disclaimer, the term of this patent is extended or adjusted under 35 U.S.C. 154(b) by 279 days.

(21) Appl. No.: 15/827,818

(22) Filed: Nov. 30, 2017

(65) Prior Publication Data

US 2019/0163340 A1 May 30, 2019

(51) Int. Cl.
| | |
|---|---|
| G06F 3/0488 | (2013.01) |
| B60W 50/12 | (2012.01) |
| E03F 7/10 | (2006.01) |
| E01H 1/10 | (2006.01) |
| E02F 3/92 | (2006.01) |
| B60W 50/08 | (2020.01) |
| G06F 3/041 | (2006.01) |
| G06F 3/0482 | (2013.01) |

(52) U.S. Cl.
CPC ........... *G06F 3/0488* (2013.01); *B60W 50/12* (2013.01); *G06F 3/0416* (2013.01); *B60L 2240/10* (2013.01); *B60L 2250/16* (2013.01); *B60L 2260/00* (2013.01); *B60W 50/08* (2013.01); *E01H 1/103* (2013.01); *E01H 1/108* (2013.01); *E02F 3/925* (2013.01); *E03F 7/103* (2013.01); *G06F 3/0482* (2013.01)

(58) Field of Classification Search
CPC ............ B60W 50/12; B60K 2370/199; B60K 2370/197
See application file for complete search history.

(56) References Cited

U.S. PATENT DOCUMENTS

| | | | |
|---|---|---|---|
| 6,131,062 A | 10/2000 | Nielsen | |
| 6,643,577 B1 | 11/2003 | Padgett et al. | |
| 6,681,551 B1 | 1/2004 | Sheidler et al. | |
| 6,694,240 B1 | 2/2004 | Swick et al. | |
| 7,274,980 B1* | 9/2007 | Schafer | B60P 1/4471 701/36 |
| 7,798,761 B2* | 9/2010 | Goodrich | A61G 3/061 318/468 |
| 8,626,407 B2* | 1/2014 | Fujimoto | B60K 37/06 701/50 |
| 10,119,245 B2* | 11/2018 | Buchleiter | E02F 3/925 |
| 2017/0341880 A1* | 11/2017 | Strobel | B65G 47/917 |

* cited by examiner

*Primary Examiner* — Todd M Melton
(74) *Attorney, Agent, or Firm* — Merchant & Gould P.C.

(57) ABSTRACT

A service mode selection system for a service vehicle is provided for simplifying a control for setting the vehicle in a desired service mode. The system includes a control system for receiving an operator's selection of service mode via a service mode selection device and controlling vehicle components to automatically set the vehicle in a selected service mode. The service mode selection device can be arranged in a cab of the vehicle and allows the operator to conveniently select a desired service mode, thereby achieving a work-ready machine with as few operator inputs as possible.

19 Claims, 13 Drawing Sheets

SERVICE MODE SELECTION SYSTEM FOR SERVICE VEHICLE

BACKGROUND

Service vehicles, such as sewer cleaning vehicles, vacuum excavating vehicles, vacuum loaders, and dump trucks, can perform multiple functions in a plurality of service modes. An operator is typically required to manipulate a variety of buttons, switches, or other types of controls in a particular sequence to have a service vehicle ready to operate a predetermined service mode. Such control sequences may vary depending on different types of service modes. A variety of control sequences take time to learn and perform in the field, and leave a high chance for user error. Further, the control sequences may be different from machine to machine. One solution is to reduce the number of controls and components to engage by the operator's input by leaving some of them turned on or engaged all the time, even in transit. However, this prevents efficient and reliable operation of the vehicle. Another solution is to provide operational instructions or decals to inform the operator of the correct steps for setting the vehicle in a particular service mode. However, this may be constrained by language or literacy barriers. It is therefore desirable to simplify the control for setting the vehicle in desired service modes with fewer inputs from the operator.

SUMMARY

In general terms, the present disclosure relates to a service mode selection system for a service vehicle. In one possible configuration and by non-limiting example, the system includes a control system for receiving an operator's selection of service mode via a service mode selection device and controlling vehicle components to automatically set the vehicle in a selected service mode. Various aspects are described in this disclosure, which include, but are not limited to, the following aspects.

One aspect is a vehicle for performing a plurality of service modes. The vehicle includes a service mode selection device and a control system. The service mode selection device is configured to receive an operator's selection of one of the plurality of service modes. The control system operates to automatically set the vehicle to the selected service mode. The control system is configured to receive the selected service mode from the service mode selection device; determine that the vehicle is in a parked position; verify an interlock for the selected service mode; and control vehicle components to set the vehicle to the selected service mode.

In certain examples, the control system is configured to, prior to controlling the vehicle components, determine manual controls are in inactive states. In certain examples, the control system is configured to generate a notification and present the notification via the service mode selection device. In certain examples, the control system is configured to, if the interlock is not satisfied for the selected service mode, modify the interlock for the selected service mode. In certain examples, the control system is configured to control at least one of the vehicle components to satisfy the interlock. The interlock may be represented by statuses of at least some of the vehicle components. The vehicle components may include at least one of a park brake status, an emergency stop status, a gear status, a wheel speed, a clutch status, and a split shaft transfer case status.

In certain example, the control system operates to control vehicle components to set the vehicle to the selected service mode by engaging a power take-off (PTO) predetermined for the selected service mode; shifting a split shaft transfer case predetermined for the selected service mode; and shifting a transmission to a gear predetermined for the selected service mode. In certain example, the control system operates to control vehicle components to set the vehicle to the selected service mode by controlling a throttle predetermined for the selected service mode. In certain examples, the control system operates to control vehicle components to set the vehicle to the selected service mode by controlling a work light predetermined for the selected service mode; controlling a strobe light predetermined for the selected service mode; and controlling a directional warning light predetermined for the selected service mode.

In certain example, the plurality of service modes may include at least one of a water jet mode, a water and vacuum combination mode, a water recirculation mode, a driving and vacuum mode, a flusher mode, and a road mode. In certain example, when the selected service mode is the water jet mode, the control system may operate to control vehicle components to set the vehicle to the selected service mode by engaging a predetermined power take-off and determining all manual controls are inactive. In certain example, when the selected service mode is the water and vacuum combination mode, the control system may operate to control vehicle components to set the vehicle to the selected service mode by shifting the split shaft transfer case, shifting a transmission to a predetermined gear, and determining all manual controls are inactive. In certain example, when the selected service mode is the water recirculation mode, the control system may operate to control vehicle components to set the vehicle to the selected service mode by enabling an operator to start the vehicle in either the water jet mode or the water and vacuum combination mode with a water pump on and hooked into a recirculation line; dropping a throttle; putting a transmission to neutral; shifting a split shaft transfer case; and turning off a power take-off. In certain example, when the selected service mode is the driving and vacuum mode, the control system may operate to control vehicle components to set the vehicle to the selected service mode by enabling an operator to start the vehicle in the water and vacuum combination mode, and engaging a hydrostatic motor to rear wheels.

Another aspect is a control system for automatically set a vehicle to one of a plurality of service modes. The control system includes a processing device and a computer readable storage medium storing software instructions that cause the processing device to generate a user interface via the service mode selection device, the service mode selection device configured to receive an operator's selection of one of the plurality of service modes; receive the selected service mode via the service mode selection device; determine that the vehicle is in a parked position; verify an interlock for the selected service mode; and control vehicle components to set the vehicle to the selected service mode.

In certain examples, the computer readable storage medium may further cause the processing device to, prior to controlling the vehicle components, determine manual controls are in inactive states. In certain examples, the computer readable storage medium may further cause the processing device to generate a notification; and present the notification via the service mode selection device. In certain examples, the computer readable storage medium may further cause the processing device to, if the interlock is not satisfied for the selected service mode, modify the interlock for the selected service mode.

Yet another aspect is a method for automatically set a vehicle to one of a plurality of service modes. The method may include generating a user interface via the service mode selection device, the service mode selection device configured to receive an operator's selection of one of the plurality of service modes; receiving the selected service mode via the service mode selection device; determining that the vehicle is in a parked position; verifying an interlock for the selected service mode; and controlling vehicle components to set the vehicle to the selected service mode.

DETAILED DESCRIPTION

Figure 1:
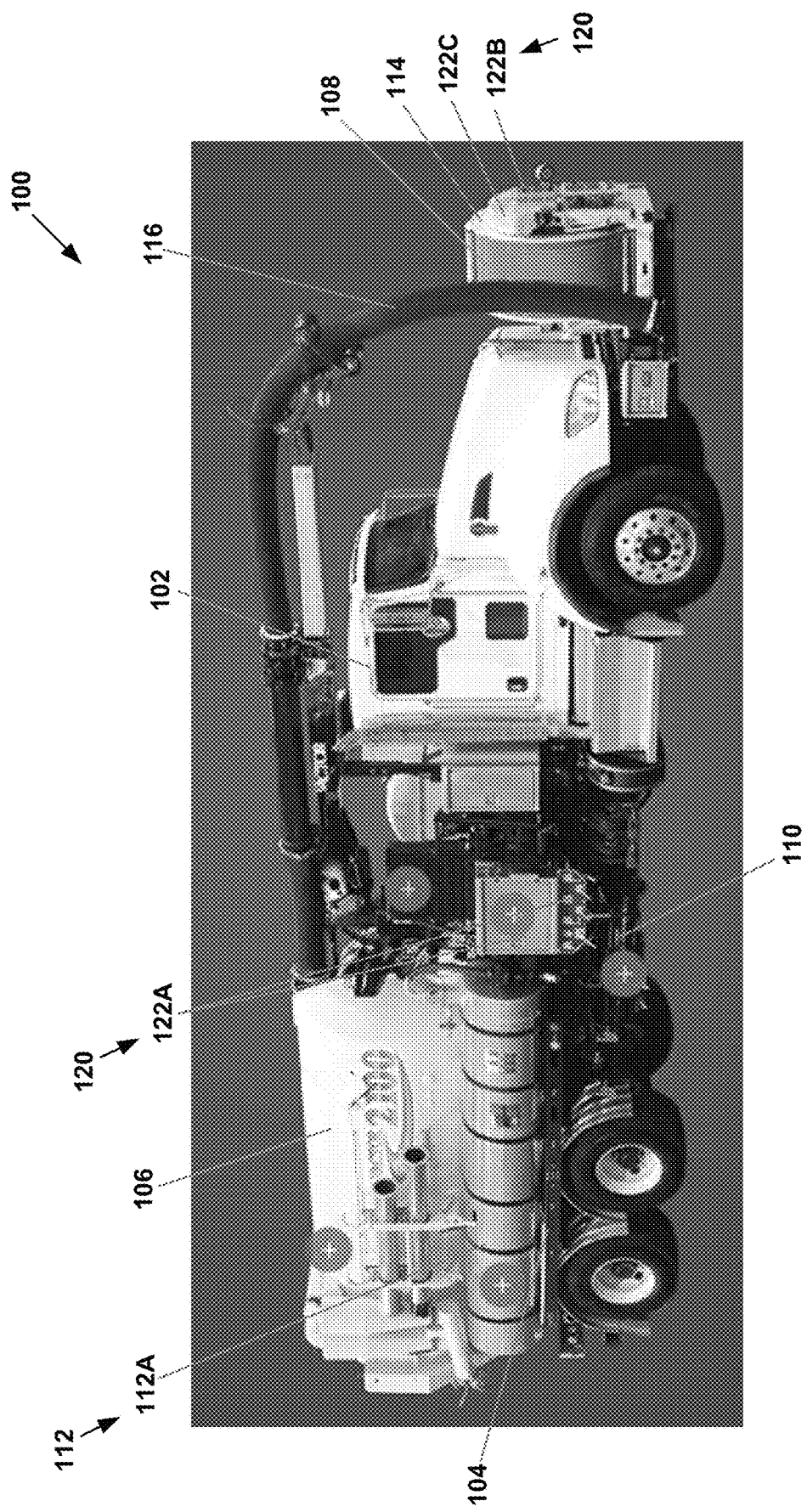
FIG. 1 is a perspective view of an exemplary embodiment of a service vehicle in accordance with the present disclosure.
Figure 2:
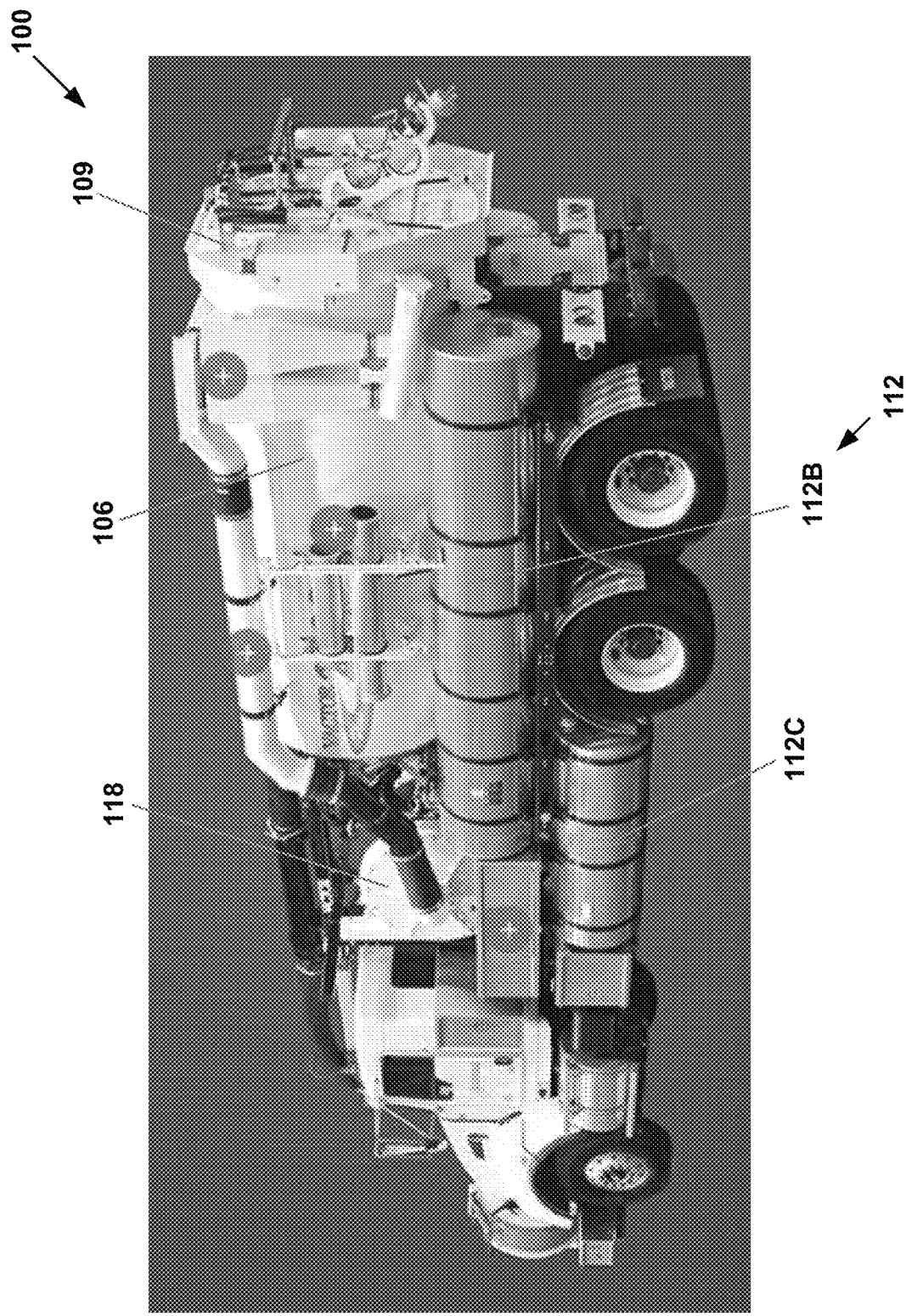
FIG. 2 is another perspective view of the service vehicle of FIG. 1.
Figure 3:
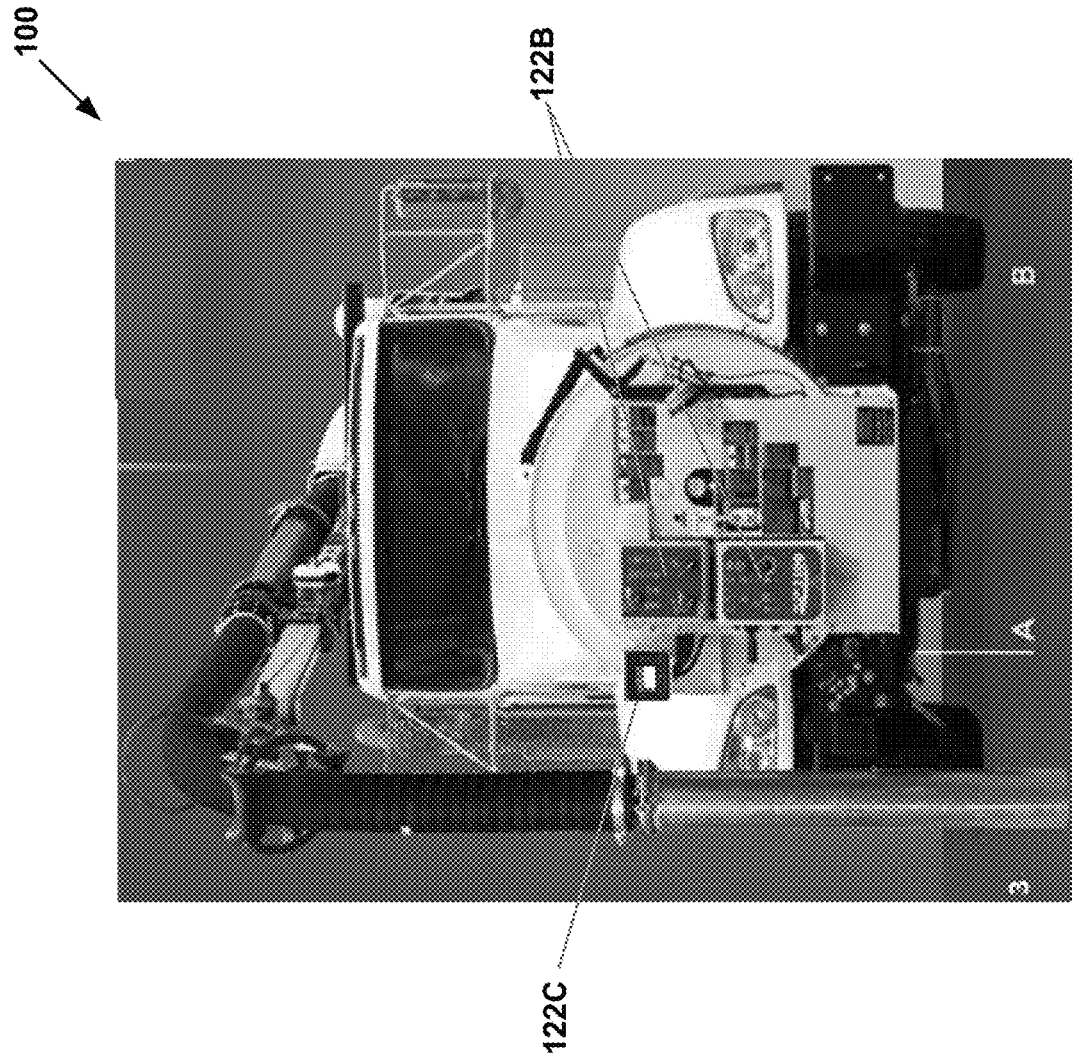
FIG. 3 is a front perspective view of the service vehicle of FIG. 1.

Various embodiments will be described in detail with reference to the drawings, wherein like reference numerals represent like parts and assemblies throughout the several views.

FIGS. 1-4 illustrate an exemplary embodiment of a service vehicle in accordance with the present disclosure. The service vehicle is generally designated by reference numeral 100. In this embodiment, the service vehicle 100 is configured as a sewer cleaning vehicle that is capable of providing jetting and vacuuming. Therefore, in this document, the service vehicle 100 is also referred to as the sewer cleaning vehicle 100. In other embodiments, the service vehicle 100 can be of other types or for other services, such as dump trucks, vacuum excavation vehicles, catch basin cleaners, water jetting vehicles, water recycling vehicles, vacuum trucks, industrial vacuum loaders, or any other vehicles for various services.

The sewer cleaning vehicle 100 includes a cab 102 and a bed 104 extending rearwards from the cab 102. A debris tank 106 is mounted to the bed 104. The debris tank 106 is used to collect debris or sludge removed from the sewer pipes being cleaned. In some examples, the debris tank 106 is pivotally mounted to the bed 104 adjacent the rear of the bed 104 such that the front of the debris tank 106 lifts off of the bed 104 and is tilted for dumping the debris collected in the debris tank 106. The rear end of the debris tank 106 includes a pivotally mounted door 109 coupled to the remainder of the debris tank 106.

At least one high pressure hose 108 is coupled at one end to a high pressure water pump 110. The other end of the hose 108 has a nozzle for high velocity spraying into sewer pipes to be cleaned. The water pump 110 supplies water from one or more water tanks 112 to the hose 108. The hose 108 can be mounted to a hose reel 114. In some examples, the hose reel 114 is arranged at the front of the vehicle 100. A vacuum hose 116 can be located adjacent the hose 108. An end of the vacuum hose 116 is fluidly coupled to the debris tank 106, and the other end of the vacuum hose 116 is configured to extend down into a desired pipe to be cleaned. In some embodiments, a vacuum pump 118 is provided at the vehicle 100 and configured to create a negative pressure inside of the debris tank 106 and utilize water or another fluid to help the vacuum pump 118 create a seal and form the vacuum. Water sprayed inside the sewer pipe being cleaned through the nozzle of the hose 116 is sucked up with debris from the pipe through the vacuum hose 116 and deposited into the debris tank 106.

The water pump 110 operates to pump water from at least one of the water tanks 112. The water pump 110 can have various configurations, such as a dual acting, single piston pump, an example of which is a Vactor Jet Rodder pump, available from Vactor Manufacturing, Streator, Ill.

The water tanks 112 are mounted to the vehicle 100 and configured to contain water for cleaning sewer pipes. In some embodiments, a plurality of water tanks 112 (including 112A, 112B, 112C) is provided for higher water capacity of the vehicle 100. The water tanks 112 can be arranged in the vehicle 100 in various configurations, depending on various considerations, such as for ease of use or optimal weight distribution. The water tanks 112 can be made of various materials. In one example, the water tanks 112 are made of aluminum for corrosion resistance and weight reduction.

The vehicle 100 can further include a control interface 120 the provides control elements for operating and controlling various components of the vehicle 100. Some examples of such vehicle components are further illustrated and described with reference to FIG. 6. In some embodiments, the control interface 120 includes one or more manual control panels, such as a side control panel 122A, a front control panel 122B, a command device 122C, and a cab control panel 122D. The control interface 120, such as the side control panel 122A and the front control panel 122B, can include physical control elements of various types, such as buttons, switches, levers, selectors, knobs, and joysticks. In other examples, the control interface 120, such as the command device 122C, includes electronic control elements. For example, the control interface 120 can be integrated with a display device with user input elements, such as a touch sensitive display screen, and include graphical user interface control elements or widgets. In some embodiments, the control interface 120 further includes a remote controller that an operator can provide control commands to the vehicle remotely.

In some embodiments, one or more of the control interface 120, such as the command device 122C, can provide image-based menu options and text, and allows an operator to log in settings, such as water flow and hose footage deployed. In addition, the command device 122C is configured to enable an operator to access various operational information. Examples of such operational information include water flow, pressure, engine speed, vacuum system speed, hose footage, and maintenance information. In some examples, the command device 122C operates to diagnose fault codes and warn the operator when an unsafe condition occurs. The command device 122C can include a safety interlock circuit which ensures proper sequencing of functions to prevent an accidental misuse of equipment, thereby protecting the system and the operator. The command device 122C can further include a diagnostic circuit that allows the operator to perform, or automatically performs, troubleshooting issues.

In some examples, the command device 122C is arranged adjacent the front control panel 122B so that the operator conveniently manipulate various functions of the system at the same place. In the illustrated example, the command device 122C and the front control panel 122B are arranged at the front of the vehicle 100. In other examples, the command device 122C is integrally configured with the front control panel 122B. For example, the front control panel 122B is incorporated with the command device 122C and/or with the display device of the command device 122C.

In some embodiments, the cab control panel 122D provides control elements for an operator to shift the transmission inside the cab 102. Other controls are also possible with the cab control panel 122D in other embodiments.

In some embodiments, the control interface 120 can includes indicators, such as lights and speakers, which are configured and operable to present the status of various components of the vehicle 100. Alternatively, the control interface 120, such as the command device 122C, displays readings, such as system pressures, in real time.

Further, the control interface 120 can include an emergency stop interface that provides an interface for an operator to disable one or more components of the vehicle 100. In some embodiments, the emergency stop interface is configured to enable an operator to stop at least one of the water pump, vacuuming function, and hydraulic functions, and to return the chassis engine to idle so that the unit comes to a safe condition without stopping the engine.

Figure 4:
FIG. 4 illustrates an interior of a cab of the vehicle including a service mode selection device.

Referring to FIG. 4, the vehicle 100 further includes a service mode selection device 150. In this example, the service mode selection device 150 is disposed in the cab 102 of the vehicle 100 and arranged close to a driver's seat so that an operator in the driver's seat can conveniently access the service mode selection device 150. The service mode selection device 150 is configured to simplify an operator's control for setting the vehicle in one of a plurality of service modes. The service mode selection device 105 enables the operator to set up the vehicle in a desired service mode by receiving one or only a few inputs from the operator through the device 100.

Figure 5A:
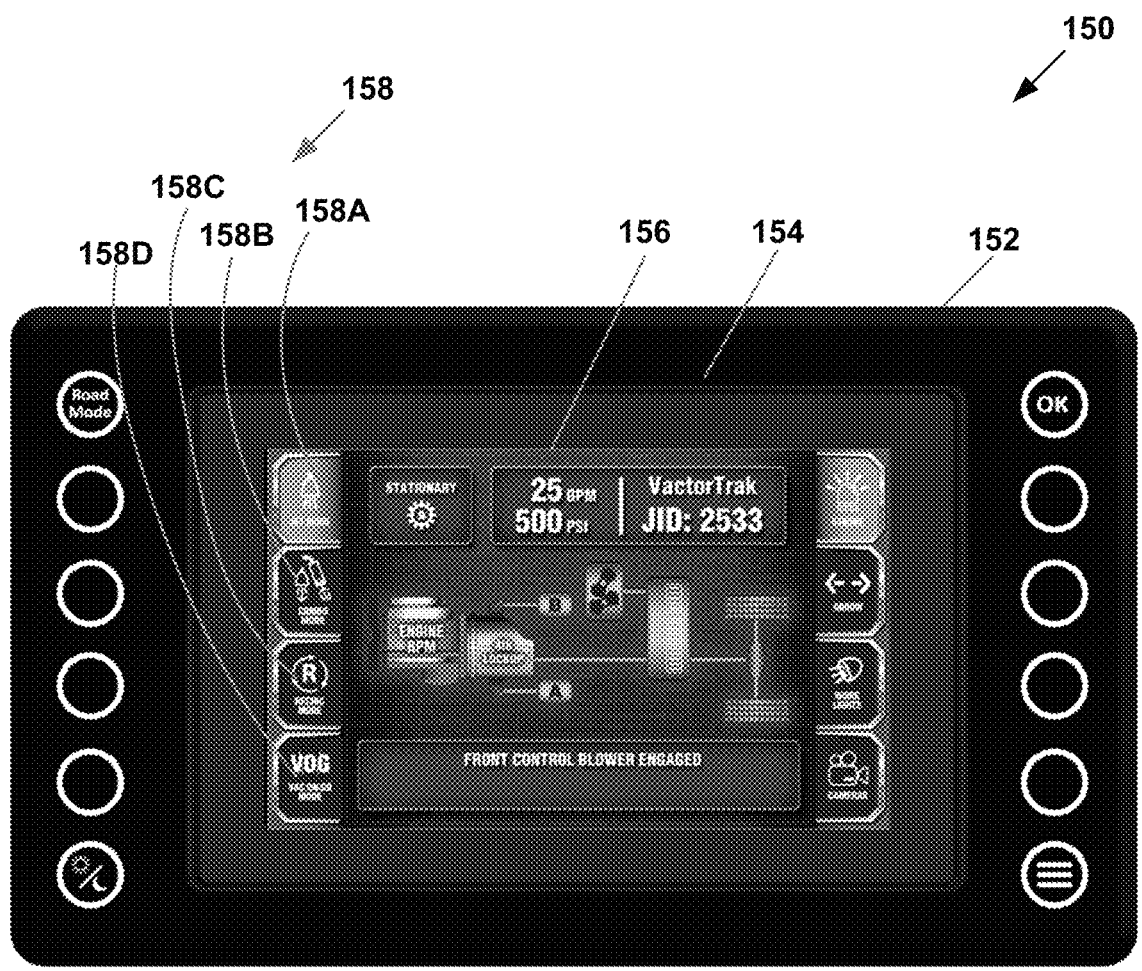
FIG. 5A is an example control interface of the service mode selection device.

As illustrated in FIG. 5A, the service mode selection device 150 provides a control interface 152 that enables an operator to select one of a plurality of service modes 380 (FIG. 10) operable by the vehicle 100. Examples of the service modes are further described and illustrated with reference to FIG. 10.

In some embodiments, the control interface 152 of the service mode selection device 150 includes a display device 154 which is configured to provide a graphical user interface (GUI) 156. The GUI 156 can provide a plurality of buttons 158 (including 158A, 158B, 158C, and 158D) for selecting various service modes. When one of the buttons 158 is selected, the vehicle 100 is controlled to automatically perform a sequence of operations to set the vehicle 100 in a service mode associated with the selected button. In some embodiments, a plurality of indicator lights 160 (e.g., multicolor indicator lights) is provided and operates to illuminate various colored lights corresponding to the buttons 158 for different service modes, thereby indicating which service mode is currently in or attempting to engage.

Figure 5B:
FIG. 5B is an example control interface of the service mode selection device with a first button selected.
Figure 5C:
FIG. 5C is an example control interface of the service mode selection device with a second button selected.
Figure 5D:
FIG. 5D is an example control interface of the service mode selection device with a third button selected.
Figure 5E:
FIG. 5E is an example control interface of the service mode selection device with a fourth button selected.

As illustrated in FIG. 5B, a first button 158A is configured, when selected, to operate the vehicle 100 to set in a water jet mode ("Jet Mode"). As illustrated in FIG. 5C, a second button 158B is configured, when selected, to operate the vehicle 100 to set in a water and vacuum combination mode ("Combo Mode"). As illustrated in FIG. 5D, a third button 158C is configured, when selected, to operate the vehicle 100 to set in a water recirculation mode ("Recirculator Mode"). As illustrated in FIG. 5E, a fourth button 158D is configured, when selected, to operate the vehicle 100 to set in a driving and vacuum mode ("Vacuum-on-the-go Mode" or "VOG"). In other embodiments, other buttons can be additionally or alternatively provided in the GUI 156 for other service modes.

Although the buttons 158 for selecting service modes are primarily illustrated as control elements in the GUI 156, it is understood that the buttons 158 can be provided as mechanical buttons or other control elements separate from the display device 154. The display device 154 can provide other information, such as the status of vehicle components.

Figure 6:
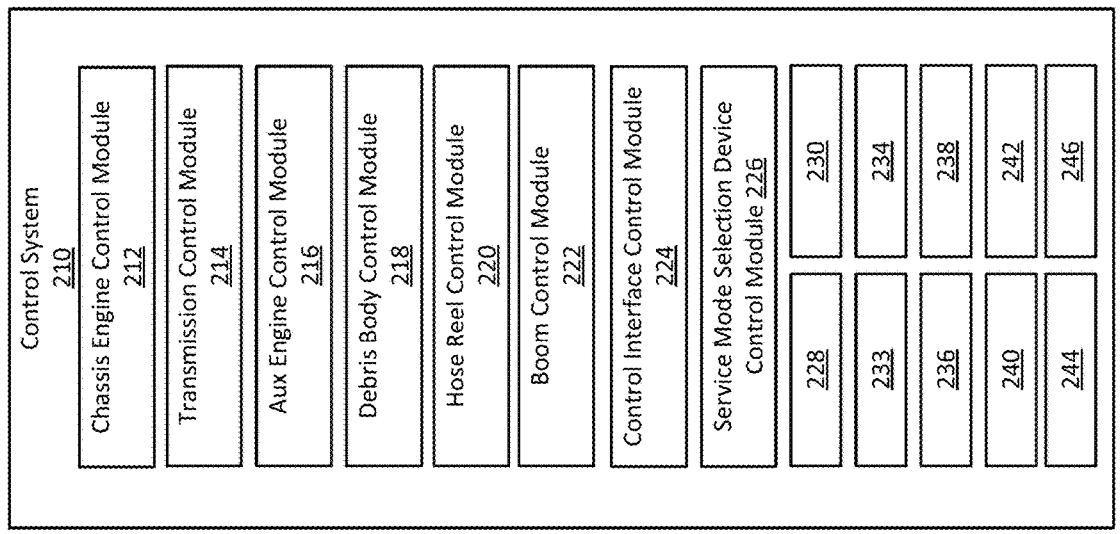
FIG. 6 is a block diagram of example vehicle components and a control system associated with the vehicle components.
Figure 6:
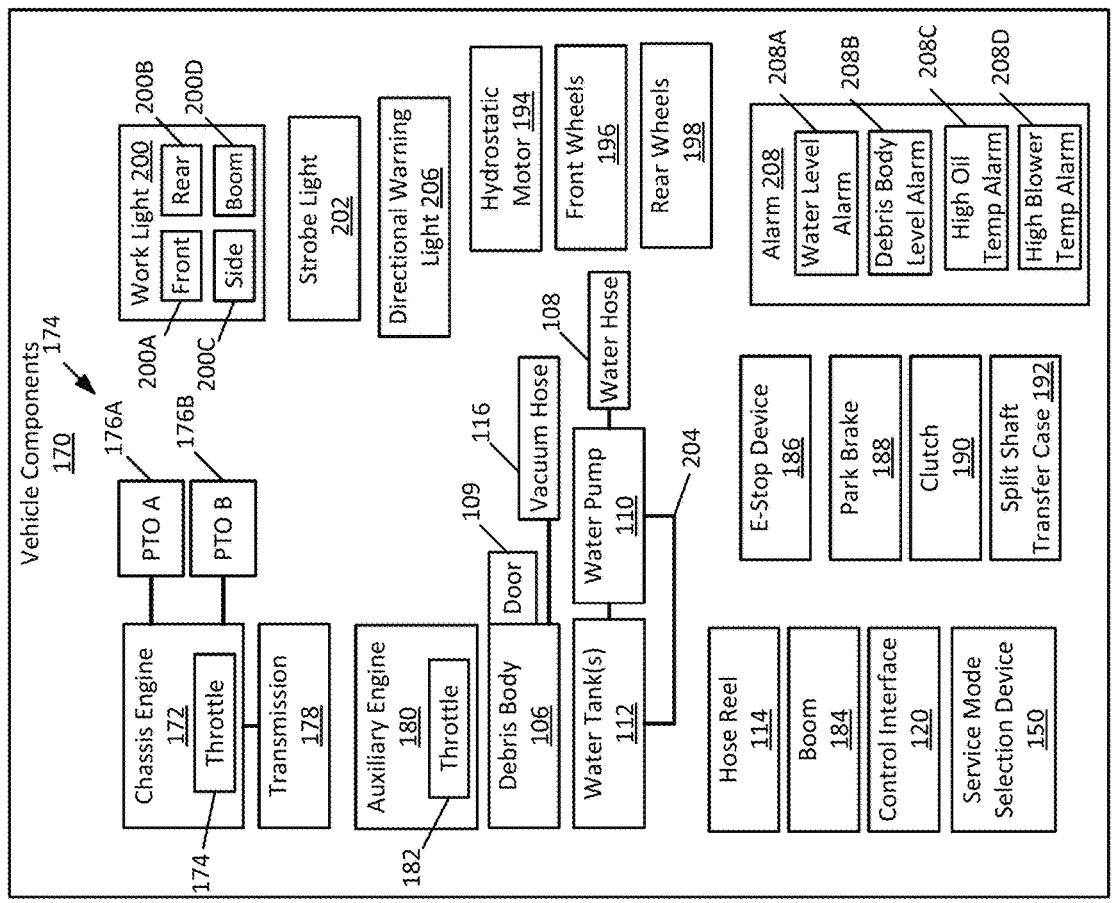

FIG. 6 is a block diagram of example vehicle components 170 and a control system 210 associated with the vehicle components 170. As illustrate in FIGS. 1-4, the vehicle components 170 includes one or more water tanks 112, the water pump 110, the debris body 106 with the door 109, the water hose 108, the hose reel 114, the vacuum hose 116, and the control interface 120 (e.g., the side control panel 122A, the front control panel 122B, the command device 122C, and the cab control panel 122D). In addition, the vehicle components 170 can include a chassis engine 172 with a first throttle 174, one or more power takeoffs (PTOs) 176, a transmission 178, an auxiliary engine 180 with a second throttle 182, a boom 184, an emergency-stop circuit 186, a park brake device 188, a clutch device 190, a split shaft transfer case 192, a hydrostatic motor 194, front wheels 196, rear wheels 198, work lights 200 (including one or more front work lights 200A, one or more rear work lights 200B, one or more side work lights 200C, and one or more boom lights 200D), strobe lights 202, a directional warning light 206 (or arrow board or arrow stick), and one or more alarm devices 208 (including a water tank level alarm device 208A, a debris body level alarm device 208B, a high oil temperature alarm 208C, and a high blower temperature alarm 208D). Further, the vehicle components 170 include the service mode selection device 150 as described herein. The vehicle components illustrated in FIG. 6 are not exhaustive examples and have other components which are not specifically described herein. In other embodiments, the vehicle components 170 does not include one or more of the components illustrated in FIG. 6. For example, in some embodiments, the vehicle does not include the auxiliary engine 180 with the second throttle 182.

The vehicle 100 includes the control system 210 that operates to control at least some of the vehicle components 170. The control system 210 includes various control modules configured to control the vehicle components 170. For example, a chassis engine control module 212 is configured to control the chassis engine 172. A transmission control module 214 is configured to control the transmission 178. An auxiliary engine control module 216 is configured to control the auxiliary engine 180. A debris body control module 218 is configured to control the debris body 106. A hose reel control module 220 is configured to control the hose reel 114. A boom control module 222 is configured to control the boom 184. A control interface control module 224 is configured to control the control interface 120. A service mode selection control module 226 is configured to control the service mode selection device 150. An emergency stop control module 228 is configured to control the emergency stop circuit 186. A park brake control module 230 is configured to control the park brake device 188. A clutch control module 232 is configured to control the clutch device 190. A split shaft transfer case control module 234 is configured to control the split shaft transfer case 192. A motor control module 236 is configured to control one or more motors, such as the hydrostatic motor 194. A wheel control module 238 is configured to control the wheels, such as the front wheels 196 and the rear wheels 198. A work light control module 240 is configured to control the work lights 200. A strobe light control module 242 is configured to control the strobe lights 202. A directional warning light control module 244 is configured to control the directional warning light 206. An alarm device control module 246 is configured to control the alarm device 208. In some embodiments, at least some of the modules described above can be combined and/or integrated into a single controller. In other embodiments, at least some of the modules described above can be combined and/or integrated into two or more controllers.

At least some of the modules in the control system 210 can communicate with each other. By way of example, the service mode selection control module 226 operates the service mode selection device 150 to present the buttons 158 for selecting various service modes and receive an operator's selection of one of the buttons 158. The service mode selection control module 226 can communicate with one or more of the other modules in the control system 210 so that one or more of the vehicle components 170 are controlled to set the vehicle 100 to the selected service mode. An example method for setting the vehicle to a desired service mode is described in more detail with reference to FIG. 7.

Figure 7:
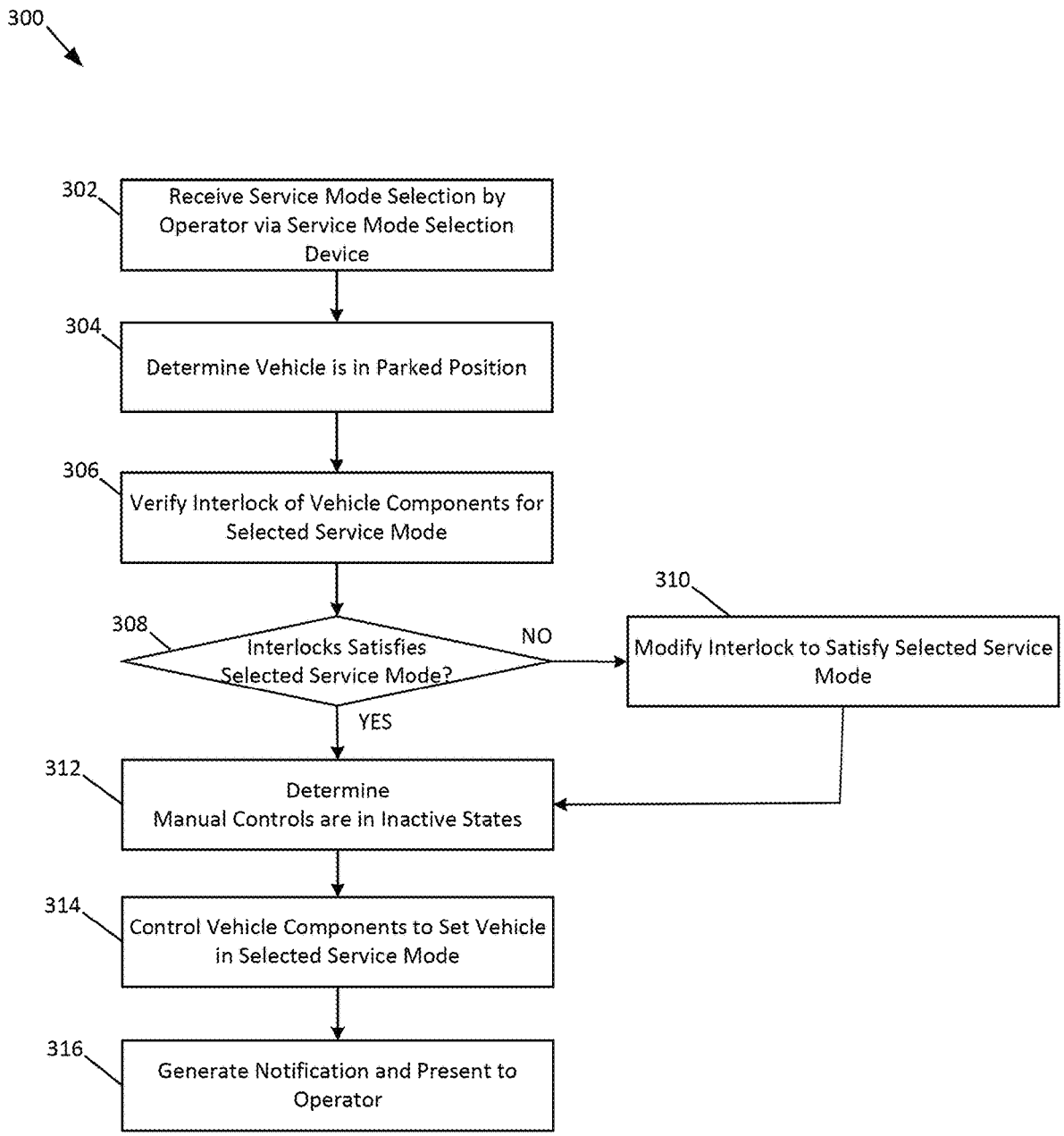
FIG. 7 is a flowchart of an example method for automatically setting the vehicle in a desired service mode.

FIG. 7 is a flowchart of an example method 300 for automatically setting the vehicle 100 in a desired service mode. In some embodiments, the method 300 is performed at least partially by the control system 210. In this embodiment, the method 300 includes operations 302, 304, 306, 308, 310, 312, 314, and 316. However, in other embodiments, the method 300 is not limited to these operations and the sequence thereof. The operations of the method 300 can be performed in different orders. Further, the method 300 can have one or more additional operations with all or some of the operations illustrated in FIG. 7.

The method 300 can begin at operation 302 in which the control system 210 receives an operator's selection of service mode via the service mode selection device 150. In some applications, when the vehicle 100 is parked at a desired location, an operator (who can be the driver) can select one of the buttons 158 that is associated with an intended service mode. As described herein, the service mode selection device 150 is provided in the cab 102 and presents the buttons 158 so that the operator can select one of the buttons 150 via the service mode selection device 150.

At operation 304, the control system 210 can determine that the vehicle 100 is in a parked position. In some embodiments, if the vehicle 100 is not determined to be in a parked position, the control system 210 can operate to generate an alarm to the operator so that the operator parks the vehicle before subsequent operations are performed.

Figure 8:
FIG. 8 illustrates example interlocks for service modes.

At operation 306, the control system 210 operates to verify an interlock 330 for the selected service mode. An interlock is a feature that makes the state of a plurality of mechanisms or functions mutually dependent, thereby preventing undesired states, such as preventing harm to the operator or damage to the vehicle. The interlock can be represented as the statuses of at least some of the vehicle components 170. By way of example, as illustrated in FIG. 8, the interlock 330 for a particular service mode can be defined with a combination of park brake status, emergency stop status, gear status, wheel speed, clutch status, and split shaft transfer case status. Other available components can be additionally or alternatively used to define the interlock 330. In some embodiments, different interlocks are provided for different service modes of the vehicle.

At operation 308, if the interlock 330 is not satisfied for the selected service mode, the method 300 moves on to operation 310 in which the control system 210 operates to automatically modify the interlock 330 to meet the selected service mode. For example, the control system 210 automatically controls relevant vehicle components (via associated control modules such as those illustrated in FIG. 6) and operates such vehicle components to satisfy the intended interlock. If the interlock 330 is satisfied for the selected service mode, the method 300 continues at operation 314.

At operation 312, the control system 210 operates to determine manual controls are in inactive states. In some embodiments, the manual controls include the control elements provided in the control interface 120, such as the side control panel 122A, the front control panel 122B, the command device 122C, and the cab control panel 122D. While the manual controls are inactive, the control system 210 can take over operations and automatically set the vehicle 100 to the selected service mode. In some embodiments, if all the manual controls are not in inactive states, the control system 210 can generate an alarm to the operator so that the operator can manipulate at least one of the manual controls to make all the manual controls inactive.

At operation 314, the control system 210 operates to automatically control the vehicle components 170 to set the vehicle 100 in the selected service mode (i.e., in a ready-to-work state for the selected service mode). In some embodiments, the vehicle components 170 are controlled in different manners for different service modes. An example method of controlling the vehicle components 170 is described in more detail with reference to FIG. 9.

At operation 316, the control system 210 operates to generate a notification and present it to the operator. In some embodiments, the notification can be displayed and/or audibly presented via the service mode selection device 150. The notification can be designed to deliver various pieces of information. For example, the notification is to confirm that the vehicle is set to the selected service mode. In other examples, the notification is configured to inform the operator that the operator can leave the cab. In yet other examples, the notification is designed to inform that operator that the operator needs to perform a particular operation or function (e.g., a hose connection).

Figure 9:
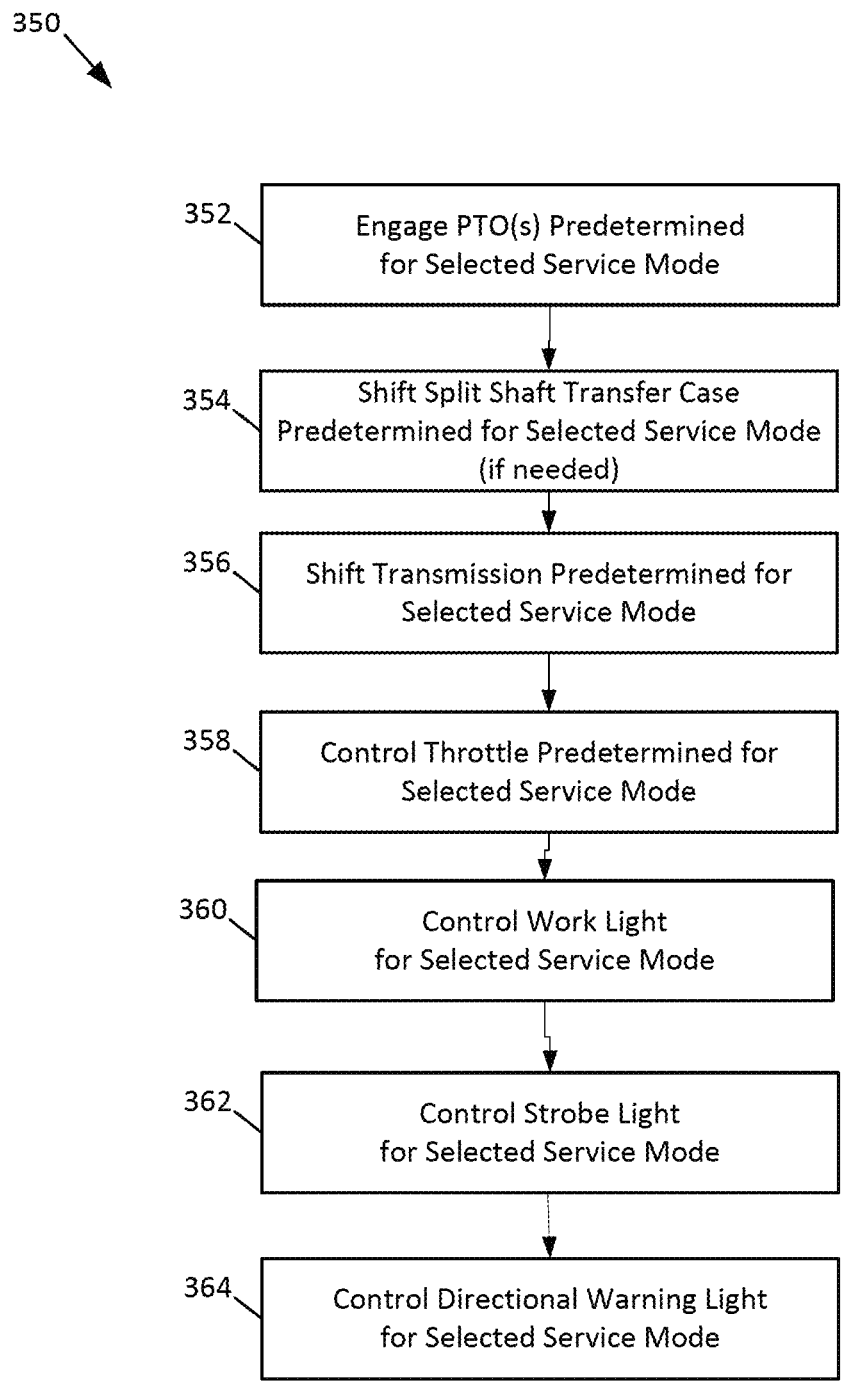
FIG. 9 is a flowchart of an example method for controlling vehicle components to set the vehicle in a selected service mode.

FIG. 9 is a flowchart of an example method 350 for controlling the vehicle components 170 to set the vehicle 100 in the selected service mode. In some embodiments, the method 350 is used to perform the operation 314 of FIG. 7. In some embodiments, the method 350 is performed at least partially by the control system 210.

At operation 352, the control system 210 operates to engage one or more PTO 176 in a predetermined manner for the service mode selected by the operator through the service mode selection device 150. At operation 354, the control system 210 operates to shift the split shaft transfer case 192 in a predetermined manner for the selected service mode. At operation 356, the control system 210 operates to shift the transmission 178 to a predetermined gear setting for the selected service mode. At operation 358, the control system 210 operates to control the first throttle 174 and/or the second throttle 182 in a predetermined manner for the selected service mode. At operation 360, the control system 210 operates to control the work lights (e.g., scene light) 200 in a predetermined manner for the selected service mode. At operation 362, the control system 210 operates to control the strobe lights (e.g., warning light) 202 in a predetermined manner for the selected service mode. At operation 364, the control system 210 operates to control the directional warning light 206 in a predetermined manner for the selected service mode.

In this embodiment, the method 350 includes the operations 352, 354, 356, 358, 360, and 362. However, in other embodiments, the method 350 is not limited to these operations and the sequence thereof. The method 350 may have one or more additional operations with all or some of the operations illustrated in FIG. 9. Some of such additional operations are described as some examples of the service modes are described with reference to FIG. 10.

Figure 10:
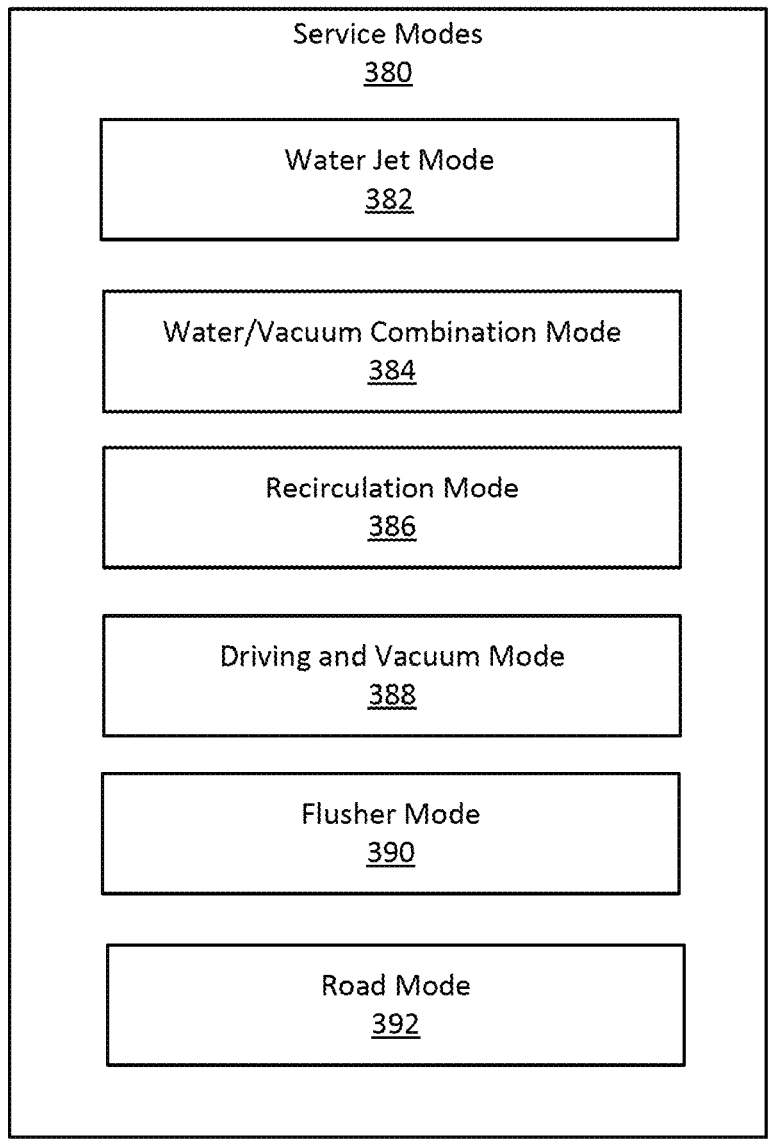
FIG. 10 is a block diagram for example service modes that can be performed with the vehicle.

FIG. 10 is a block diagram for example service modes 380 that can be performed with the vehicle 100. As described herein, each of the service modes 380 is automatically set up when an operator selects that service mode through the service mode selection device 150. The service modes 380 can include a water jet mode 382, a water and vacuum combination mode 384, a water recirculation mode 386, a driving and vacuum mode 388, a flusher mode 390, and a road mode 392.

In the water jet mode 382, the vehicle 100 is set to perform water jetting only. When an operator selects the water jet mode 382, such as by selecting the first button 158A presented in the service mode selection device 150, the control system 210 operates to monitor the interlock 300 for the water jet mode 382. If the interlock 300 is not satisfied for the water jet mode 382, the control system 210 can automatically operate to fix the interlock 300. Once the interlock 300 is verified, the control system 210 can operate to perform at least some of the operations in the method 350 and/or other operations to set the vehicle 382 in the water jet mode 382. For example, the control system 210 can engage a desired PTO 176, determine that all the manual controls are inactive, and perform subsequent operations necessary to change the vehicle 382 in the water jet mode 382.

In the water and vacuum combination mode 384, the vehicle 100 is set to perform vacuuming and water jetting together. When an operator selects the water and vacuum combination mode 384 by, for example, selecting the second button 158B via the service mode selection device 150, the control system 210 operates to monitor the interlock 300 for the water jet mode 382. If the interlock 300 is not satisfied for the water jet mode 382, the control system 210 can automatically operate to fix the interlock 300. The control system 210 can further verify presence of the operator in the cab 102. Once the interlock 300 and the presence of the operator are verified, the control system 210 can operate to shift the split shaft transfer case 192 and shift the transmission to a predetermined gear such that associated components are operated at a predetermined speed. In some embodiments, a device, such as a torque converter, can be used to lock up the transmission to or beyond the predetermined speed. In some embodiments, the control system 210 can operate to shift the transmission back to neutral. Once the transmission shift is performed, the control system 102 can generate a notification to the operator via the service mode selection device 150, the notification including information that the transmission shift has been performed and the operator can leave the cab 102. The control system 102 can also determine that all the manual controls are inactive positions. As a result, the vehicle 100 is in the water and vacuum combination mode 384 so that all necessary vacuum and water controls become active.

In the water recirculation mode 386, the vehicle 100 is set to allow water flow with certain pressure and flow rate while the vehicle 100 is driven, thereby keeping water from freezing in transit. In some embodiments, an operator can manipulate the control interface 120 to start the vehicle 100 in either the water jet mode 382 or the water and vacuum combination mode 384 with the water pump 110 on and hooked into a recirculation line 204 (FIG. 6) to send water back to the water tank(s) 112. Then, the operator can come back in the cab 102 and select the recirculation mode 386 by, for example, selecting the third button 158C via the service mode selection device 150. In some embodiments, the control system 210 can operate to drop the throttle 174, put the transmission 178 to neutral, and shift the split shaft transfer case 192. Then, the control system 210 can operate to turn off one of the PTOs 176 if necessary, thereby setting the vehicle 100 in the water recirculation mode 386. In some embodiments, the control system 210 operates to generate a notification via the service mode selection device 150, informing that the water recirculation mode 306 has been set up.

In the driving and vacuum mode 388, the vehicle 100 is set to perform vacuuming while the vehicle 100 is slowly driven. In some embodiments, the vehicle 100 can allow some water flow. The operator can manipulate the control interface 120 to start the vehicle 100 in the water and vacuum combination mode 384 with the vacuum and water system in a state that the operator desires, or with a remote control active. Then, the operator can return into the cab 102 and select the driving and vacuum mode 388 by, for example, selecting the fourth button 158D via the service mode selection device 150. The control system 210 operates to engage the hydrostatic motor 194 to the rear wheels 198, and, if needed, turn the hydrostatic motor 194 to facilitate the engagement. The control system 210 then verifies the engagement and generates a notification to the operator via the service mode selection device 150, informing that the park brake 188 can be released and the vehicle 100 can be driven through the hydrostatic system. In addition, the control system 210 can provide various pieces of information and control status to the operator via the service mode selection device 150. The hydrostatic system includes a variable displacement hydraulic pump and a hydraulic motor that together take power from the chassis and use it to drive the rear wheels. The hydrostatic system is connected to both sides of the split shaft transfer case. The transmission side has the variable displacement hydraulic pump attached and is powered by the vehicle driveline. The rear wheel side of the split shaft transfer case has the hydraulic motor attached. The pump and the motor are linked by hydraulic lines. When in the driving and vacuum mode, the transfer case is split so that power does not go directly from the transmission to the rear wheels, and the hydraulic motor is engaged to the rear wheels. Then the pump is controlled to send oil to the motor to drive the truck forward or reverse (flow through the pump and the motor can be reversed without changing the input power).

In the flusher mode 390, the vehicle 100 is set to flush a street or object with a low pressure, high flow water for cleaning. The vehicle 100 can be set to the flusher mode 390 in a similar manner to the water recirculation mode 386, except that the control system 210 operates at least one of the PTOs 176 to power a different pump.

In the road mode 392, the vehicle 100 is set to be in a normal driving condition. The control system 210 operates to turn all the controls associated with the service functions in inactive states for normal road transportation. For example, the control system 210 operates to disengage the PTOs 176, the split shaft transfer case 192, and other vehicle components as necessary.

In addition, in some embodiments, the vehicle 100 can have other modes. In some embodiments, the modes are configured to activate and/or deactivate one or more vehicle components in various manners. Any data associated with the vehicle 100, such as controller inputs, controller outputs, user programmable settings, and vehicle CANbus data, can be used to set various modes. The control system 210 is configured to receive various inputs from the operator via the service mode selection device 150 and perform various functions based on the inputs.

For example, the service mode selection device 150 provides a user interface for an operator to change various settings. The operator can select and control various control elements displayed in the service mode selection device 150. Examples of such control elements include controls for the directional warning light 206 for each of the service modes, selection controls for strobe lights 202 (e.g., on, off, or do nothing) for each of the service modes, selection controls for each work light 200 (e.g., on, off, or do nothing) for each of the service modes, controls for setting a lower water alarm level in each of the service modes, controls for setting a debris body fill level in each vacuum mode, controls for adjusting backlight levels (e.g., day/night), and controls for setting a maximum weight.

In other examples, the control system 210 operates to receive various inputs, such as headlight status, turn signal status, water level (sensed by, e.g., a water level sensor), debris body level (sensed by, e.g., a debris body level sensor), weight (sensed by, e.g., a scale system), and time (detected by, e.g., a real time clock). The control system 210 can operate to process, evaluate, and use such inputs to perform or generate various outputs, such as alarm, work light relays, strobe/warning light relays, and backlight level display.

By way of example, the control system 210 can monitor the current service mode of the vehicle, the current time, and the headlights status, and, if it is determined that the vehicle 100 is in the road mode with the headlights on at night, the control system 210 operates to turn the backlights down to a night mode so as not to blind drivers.

In another example, the control system 210 can monitor the current service mode of the vehicle, and, if it is determined that the vehicle is in the water jet mode 382, the control system 210 operates to turn the directional warning light 206 on to point a particular direction (e.g., left) and turn on the strobe lights 202. If it is determined that the current time is night, or if it is determined that the headlights are on, the control system 210 further operates to turn on the side and rear work lights 200B and 202C.

In yet another example, if the control system 210 detects that the vehicle 100 enters the road mode 390, the control system 210 operates to turn off the work lights 200 and the directional warning light 206. In addition, in some embodiments, the control system 210 can operate to not change the status of the strobe lights 202 ("do nothing").

In yet another example, if the control system 210 detects that the vehicle 100 enters the water and vacuum combination mode 384, the control system 210 operates to turn on the boom work lights 200D and the directional warning light 206 pointing to a predetermined direction (e.g., pointing right. In addition, the control system 210 can operate to turn on the strobe lights 202.

In yet another example, if the control system 210 detects that the vehicle 100 enters the driving and vacuum mode 388, the control system 210 operates to turn on the strobe lights 202. In addition, the control system 210 can operate to turn on the directional warning light 206 in a predetermined mode, such as pointing alternatingly right and left. Further, the control system 210 can operate to not change the status of the work lights 200 ("do nothing").

In yet another example, if the control system 210 detects that the vehicle 100 enters the recirculation mode 386 or the road mode 390, the control system 210 operates to disable the water tank level alarm device 208A.

In yet another example, if the control system 210 detects that the vehicle 100 enters the driving and vacuum mode 388, the control system 210 operates to set the debris body level alarm device 208B to be activated at half level of the debris tank 106.

Figure 11:
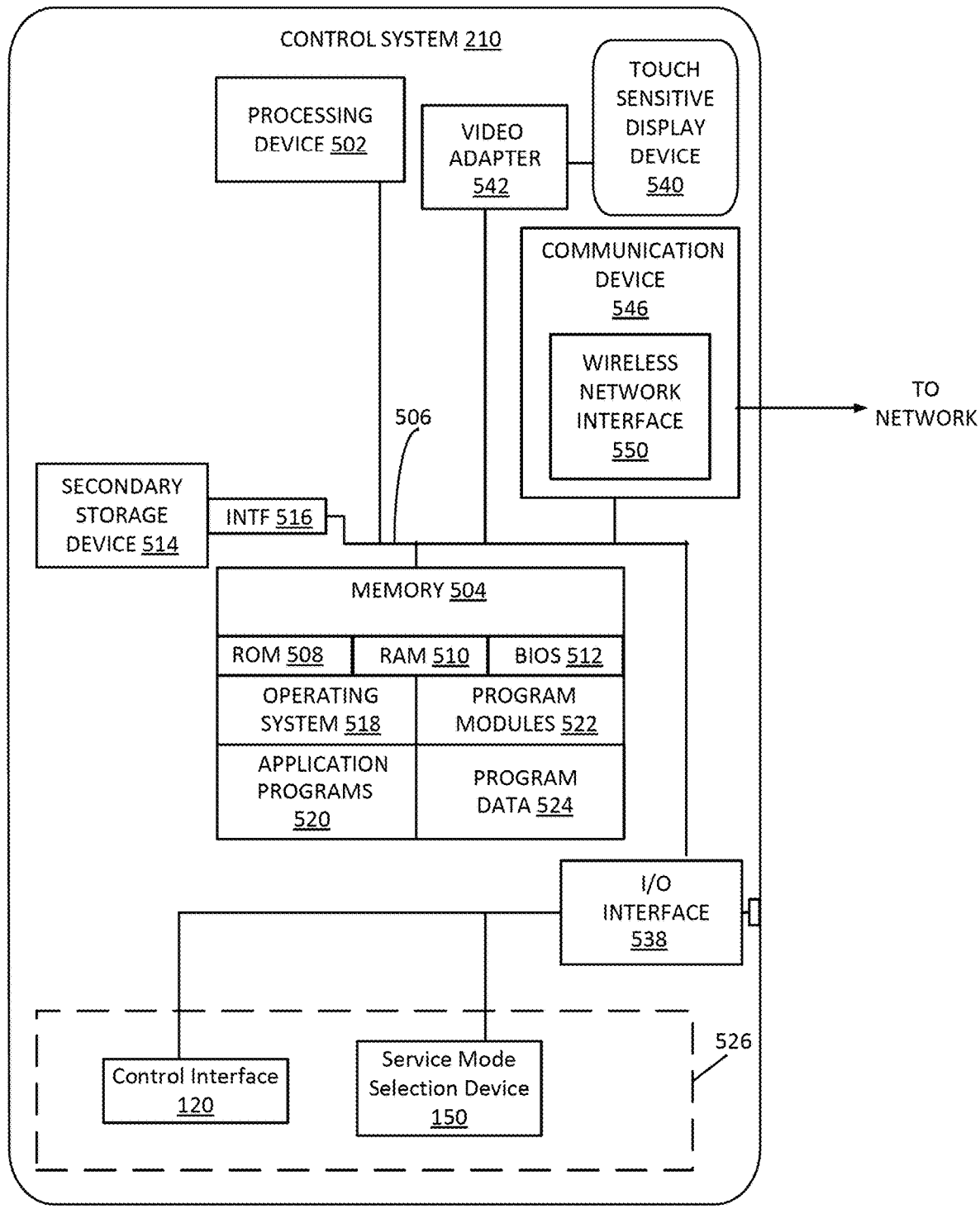
FIG. 11 illustrates an exemplary architecture of the control system.

FIG. 11 illustrates an exemplary architecture of the control system 210. The control system 210 is used to execute the operating system, application programs, and software modules (including the software engines) described herein.

The control system 210 includes, in some embodiments, at least one processing device 502, such as a central processing unit (CPU). A variety of processing devices are available from a variety of manufacturers, for example, Intel or Advanced Micro Devices. In this example, the control system 210 also includes a system memory 504, and a system bus 506 that couples various system components including the system memory 504 to the processing device 502. The system bus 506 is one of any number of types of bus structures including a memory bus, or memory controller; a peripheral bus; and a local bus using any of a variety of bus architectures. An example of the system bus 506 in this embodiment includes SAE J1939 CAN bus.

The system memory 504 includes read only memory 508 and random access memory 510. A basic input/output system 512 containing the basic routines that act to transfer information within the computing device 500, such as during start up, is typically stored in the read only memory 508.

The control system 210 also includes a secondary storage device 514 in some embodiments, such as a hard disk drive, for storing digital data. The secondary storage device 514 is connected to the system bus 506 by a secondary storage interface 516. The secondary storage devices and their associated computer readable media provide nonvolatile storage of computer readable instructions (including application programs and program modules), data structures, and other data for the control system 210.

Although the exemplary environment described herein employs a hard disk drive as a secondary storage device, other types of computer readable storage media are used in other embodiments. Examples of these other types of computer readable storage media include flash memory cards, digital video disks, compact disc read only memories, digital versatile disk read only memories, random access memories, or read only memories. Some embodiments include non-transitory media.

A number of program modules can be stored in secondary storage device 514 or memory 504, including an operating system 518, one or more application programs 520, other program modules 522, and program data 524. Examples of the modules include the modules illustrated in FIG. 6, as described herein.

In some embodiments, the control system 210 includes input devices to enable a user to provide inputs to the control system 210. Examples of input devices 526 include the control interface 120 and the service mode selection device 150, as described herein. Other embodiments include other input devices. The input devices are often connected to the processing device 502 through an input/output interface 538 that is coupled to the system bus 506. These input devices 526 can be connected by any number of input/output interfaces, such as a parallel port, serial port, game port, or a universal serial bus. Wireless communication between input devices and interface 538 is possible as well, and includes infrared, BLUETOOTH® wireless technology, 802.11a/b/g/n, cellular, or other radio frequency communication systems in some possible embodiments.

In this example embodiment, a touch sensitive display device 540 is also connected to the system bus 506 via an interface, such as a video adapter 542. As described herein, in some embodiments, the touch sensitive display device 540 is incorporated in the control interface 120 and/or the service mode selection device 150. The touch sensitive display device 540 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

The control system 210 further includes a communication device 546 configured to establish communication across the network. In some embodiments, when used in a local area networking environment or a wide area networking environment (such as the Internet), the control system 210 is typically connected to the network through a network interface, such as a wireless network interface 550. Other possible embodiments use other wired and/or wireless communication devices. For example, some embodiments of the control system 210 include an Ethernet network interface, or a modem for communicating across the network. In yet other embodiments, the communication device 546 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The control system 210 typically includes at least some form of computer-readable media. Computer readable media includes any available media that can be accessed by the control system 210. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, or any other medium that can be used to store the desired information and that can be accessed by the computing device 500. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 11 is also an example of programmable electronics, which may include one or more such control devices or computing devices, and when multiple control devices or computing devices are included, such control devices or computing devices can be coupled together with a suitable data communication network so as to collectively perform the various functions, methods, or operations disclosed herein.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A vehicle for performing a plurality of service modes, the vehicle comprising:
   a service mode selection device configured to receive an operator's selection of one of the plurality of service modes;
   a control system configured to automatically set the vehicle to the selected service mode,
   the control system configured to:
   store the plurality of service modes, wherein each of the plurality of service modes are defined at least partially by predefined operational conditions of a plurality of vehicle components;
   receive the selected service mode from the service mode selection device;
   determine that the vehicle is in a parked position;
   verify an interlock for the selected service mode, wherein the interlock prevents the vehicle from being set into the selected service mode until predefined status requirements of the plurality of vehicle components are satisfied;

automatically control status conditions of the plurality of vehicle components to meet the predefined status requirements; and once the interlock is satisfied, automatically control the plurality of vehicle components to the predefined operational conditions to set the vehicle to the selected service mode.

2. The vehicle of claim 1, wherein the control system is configured to:

prior to controlling the vehicle components, determine manual controls are in inactive states.

3. The vehicle of claim 1, wherein the control system is configured to:

generate a notification; and present the notification via the service mode selection device.

4. The vehicle of claim 1, wherein the plurality of vehicle components include at least one of a park brake status, an emergency stop status, a gear status, a wheel speed, a clutch status, and a split shaft transfer case status.

5. The vehicle of claim 1, wherein the control system operates to control vehicle components to set the vehicle to the selected service mode by:

engaging a power take-off (PTO) predetermined for the selected service mode;

shifting a split shaft transfer case predetermined for the selected service mode; and shifting a transmission to a gear predetermined for the selected service mode.

6. The vehicle of claim 5, wherein the control system operates to control vehicle components to set the vehicle to the selected service mode by:

controlling a throttle predetermined for the selected service mode.

7. The vehicle of claim 5, wherein the control system operates to control vehicle components to set the vehicle to the selected service mode by:

controlling a work light predetermined for the selected service mode;

controlling a strobe light predetermined for the selected service mode; and controlling a directional warning light predetermined for the selected service mode.

8. The vehicle of claim 1, wherein the plurality of service modes includes at least one of a water jet mode, a water and vacuum combination mode, a water recirculation mode, a driving and vacuum mode, a flusher mode, and a road mode.

9. The vehicle of claim 8, wherein the selected service mode is the water jet mode, and wherein the control system operates to control vehicle components to set the vehicle to the selected service mode by:

engaging a predetermined power take-off; and determining all manual controls are inactive.

10. The vehicle of claim 9, wherein the control system operates to control vehicle components to set the vehicle to the selected service mode by:

controlling a throttle.

11. The vehicle of claim 8, wherein the selected service mode is the water and vacuum combination mode, and wherein the control system operates to control vehicle components to set the vehicle to the selected service mode by:

engaging a predetermined power take-off;

shifting the split shaft transfer case;

shifting a transmission to a predetermined gear; and determining all manual controls are inactive.

12. The vehicle of claim 11, wherein the control system operates to control vehicle components to set the vehicle to the selected service mode by:

controlling a throttle.

13. The vehicle of claim 8, wherein the selected service mode is the water recirculation mode, and wherein the control system operates to control vehicle components to set the vehicle to the selected service mode by:

enabling an operator to start the vehicle in either the water jet mode or the water and vacuum combination mode with a water pump on and hooked into a recirculation line;

dropping a throttle;

putting a transmission to neutral;

shifting a split shaft transfer case; and turning off a power take-off.

14. The vehicle of claim 8, wherein the selected service mode is the driving and vacuum mode, and wherein the control system operates to control vehicle components to set the vehicle to the selected service mode by:

enabling an operator to start the vehicle in the water and vacuum combination mode; and engaging a hydrostatic motor to rear wheels.

15. The vehicle of claim 14, wherein the control system operates to control vehicle components to set the vehicle to the selected service mode by:

controlling a throttle.

16. A control system for automatically setting a vehicle to one of a plurality of service modes, the control system including a processing device and a computer readable storage medium storing software instructions that cause the processing device to:

store the plurality of service modes, wherein each of the plurality of service modes are defined at least partially by predefined operational conditions of a plurality of vehicle components;

generate a user interface at a service mode selection device, the service mode selection device configured to receive an operator's selection of one of the plurality of service modes;

receive the selected service mode via the service mode selection device;

determine that the vehicle is in a parked position;

verify an interlock for the selected service mode, wherein the interlock prevents the vehicle from being set into the selected service mode until predefined status requirements of the plurality of vehicle components are satisfied;

automatically control status conditions of the plurality of vehicle components to meet the predefined status requirements; and once the interlock is satisfied, automatically control the plurality of vehicle components to the predefined operational conditions to set the vehicle to the selected service mode.

17. The control system of claim 16, wherein the computer readable storage medium further cause the processing device to:

prior to controlling the vehicle components, determine manual controls are in inactive states.

18. The control system of claim 16, wherein the computer readable storage medium further cause the processing device to:

generate a notification; and present the notification via the service mode selection device.

19. A method for automatically setting a vehicle to one of a plurality of service modes, the method including:
- storing the plurality of service modes, wherein each of the plurality of service modes are defined at least partially by predefined operational conditions of a plurality of vehicle components;
- generating a user interface at a service mode selection device, the service mode selection device configured to receive an operator's selection of one of the plurality of service modes;
- receiving the selected service mode via the service mode selection device;
- determining that the vehicle is in a parked position;
- verifying an interlock for the selected service mode, wherein the interlock prevents the vehicle from being set into the selected service mode until predefined status requirements of the plurality of vehicle components are satisfied;
- automatically controlling status conditions of the plurality of vehicle components to meet the predefined status requirements; and
- once the interlock is satisfied, automatically controlling the plurality of vehicle components to the predefined operational conditions to set the vehicle to the selected service mode.

* * * * *